United States Patent
Spariosu et al.

(10) Patent No.: US 12,451,669 B2
(45) Date of Patent: Oct. 21, 2025

(54) HIGH POWER MMW SYNTHESIZER WITH TRULY CONTINUOUS ULTRA WIDE BANDWIDTH TUNING RANGE

(71) Applicant: Raytheon Company, Waltham, MA (US)

(72) Inventors: Kalin Spariosu, El Segundo, CA (US); Paul T. Hartin, McKinney, TX (US); Michael R. Patrizi, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 758 days.

(21) Appl. No.: 17/748,698

(22) Filed: May 19, 2022

(65) Prior Publication Data

US 2022/0393429 A1 Dec. 8, 2022

Related U.S. Application Data

(60) Provisional application No. 63/193,378, filed on May 26, 2021.

(51) Int. Cl.
*H01S 3/115* (2006.01)
*H01S 5/026* (2006.01)
(Continued)

(52) U.S. Cl.
CPC .......... *H01S 5/0657* (2013.01); *H01S 5/0265* (2013.01); *H01S 5/06253* (2013.01);
(Continued)

(58) Field of Classification Search
CPC .. H01S 5/0657; H01S 5/0265; H01S 5/06253; H01S 5/141; H01S 3/107; H01S 5/0601; H01S 5/0607
See application file for complete search history.

(56) References Cited

U.S. PATENT DOCUMENTS 9,780,525 B2 10/2017 Arsenijevic et al.
9,787,051 B2 * 10/2017 Fermann .............. H01S 3/1115
(Continued)

FOREIGN PATENT DOCUMENTS

CN 101478108 B 7/2010

OTHER PUBLICATIONS

Van Gasse, et al., "An on-chip III-V-semiconductor-on-silicon laser frequency comb for gas-phase molecular spectroscopy in real-time;" arxiv.org; Cornell University Library; Jun. 26, 2020; 17 pages.
(Continued)

*Primary Examiner* — Kinam Park

(57) ABSTRACT

A synthesizer includes a first resonator mirror, a second resonator mirror, and a gain medium disposed within a laser resonator cavity defined by the first resonator mirror and the second resonator mirror. The synthesizer includes a saturable absorber operationally coupled to the gain medium and having active control such that the saturable absorber is configured to generate a waveform via an injection locking signal to create a mode locking effect, the waveform having a frequency comb defined by dimensions of the gain medium. The synthesizer also includes a crystal electro-optical modulator disposed within the laser resonator cavity. The waveform passes through the modulator to impinge on a photodiode to output an emission RF waveform. Changing the voltage applied to the modulator changes the index of refraction of the modulator, altering an optical path length of the laser resonator cavity to adjust a frequency of the emission RF waveform.

20 Claims, 6 Drawing Sheets

(51) Int. Cl.
*H01S 5/0625* (2006.01)
*H01S 5/065* (2006.01)
*H01S 5/14* (2006.01)
H01S 3/107 (2006.01)
H01S 5/06 (2006.01)

(52) U.S. Cl.
CPC ............. *H01S 5/141* (2013.01); *H01S 3/107* (2013.01); *H01S 5/0601* (2013.01); *H01S 5/0607* (2013.01)

(56) References Cited

U.S. PATENT DOCUMENTS

| | | | |
|---|---|---|---|
| 2003/0095737 A1* | 5/2003 | Welch | G02B 6/136 |
| | | | 385/14 |
| 2006/0023757 A1 | 2/2006 | Mooradian et al. | |
| 2012/0133931 A1* | 5/2012 | Fermann | G01J 3/10 |
| | | | 372/18 |
| 2016/0226216 A1* | 8/2016 | Schilt | H01S 3/0092 |
| 2020/0014167 A1* | 1/2020 | Rolland | H01S 3/1307 |

OTHER PUBLICATIONS

Zhu, et al., "A Coupled Optoelectronic Oscillator Based on a Resonant Saturable Absorber Mirror;" Retrieved from https://www.ursi.org/proceedings/procGA17/papers/Paper_D1P-1(3003).pdf; Sep. 15, 2018; 3 pages.

* cited by examiner

HIGH POWER MMW SYNTHESIZER WITH TRULY CONTINUOUS ULTRA WIDE BANDWIDTH TUNING RANGE

REFERENCE TO RELATED APPLICATIONS

This application claims priority to and the benefit of U.S. Provisional Patent Application No. 63/193,378, filed on May 26, 2021, entitled "HIGH POWER MMW SYNTHESIZER WITH TRULY CONTINUOUS ULTRA WIDE BANDWIDTH TUNING RANGE," the entire content of which are incorporated herein by reference.

TECHNICAL FIELD

The subject disclosure relates to synthesizers, and more particularly to radio frequency (RF) or millimeter wave (MMW) synthesizers including quasi-optical or photonic RF source generating techniques utilizing electro-optical modulators.

BACKGROUND

Quasi-optical RF and MMW sources utilize a frequency comb generated by photonic integrated circuit (PIC) based mode locked (ML) semi-conductor lasers (SCLs). ML SCLs feature an inherent fixed-phase relationship between longitudinal modes within a laser resonator cavity. In essence, the longitudinal modes of the ML laser are mutually coherent. A longitudinal mode is a sinusoidal oscillation of a wave at a fixed frequency. As such, a mode locked laser-based synthesizer utilizes the interference between two or more waves of natural or resonant frequencies within a laser resonator cavity to produce superimposing sinusoidal waves with different frequencies defined by longitudinal mode frequency spacing to form resultant waves of frequencies governed by the difference in the natural or resonant frequencies generated by the frequency "comb". As such, a synthesizer can generate different frequencies defined by the mode locked laser waveform. Tunable radiofrequency (RF) or MMW tone generation is effected by modulating or tuning the two or more frequency component pairs from the ML SCL generated frequency comb.

Applications of wideband electronic warfare (EW) receivers or exciters, millimeter wave radar or related EW systems, and other high frequency applications, up to and including systems using W-band, require compact, low size, weight, power, and cost (SWaP-C) MMW sources or synthesizers with wideband frequency tunability. Current state of the art techniques cannot cover the full required bandwidths with a single frequency source, requiring multiple sources, mixing stages, or frequency doublers. In addition, a resulting multi-tone approach requires extensive filtering. The resulting systems are highly complex and inefficient, with a large SWaP-C footprint and commensurate substantial cost.

State of the art mode locked laser-based RF generators have been implemented only at fixed frequencies. RF or MMW tunable synthesizers based on ML SCLs currently utilize external modulators or injection locking from a micro-resonator, therefore inherently at low local oscillator (LO) power levels such as <−20 decibel-milli-Watt (dBm). To achieve requisite, practical RF or MMW tunable synthesizer powers, the current state of the art approaches invariably require optical and RF amplifiers. These architectures suffer from high complexity, a large footprint, and are subject to environmentally (thermal, vibration) noise effects for which amplifiers are especially sensitive to. Some approaches require or utilize multiple amplifier stages where these noise effects due to environmental perturbations are further exacerbated.

SUMMARY

In at least one aspect, this application describes an exemplary use of a high-power MMW synthesizer with truly continuous ultra-wide bandwidth tuning range, utilizing a direct high power MMW base frequency generator with continuous wide range tunability. The tunability is enabled by an intra-cavity (IC) high nonlinear coefficient Kerr modulator that enables a large optical path length (OPL) and oscillator cavity length changes with a modest footprint and benign control voltage levels. A frequency comb (FC) is generated by an inherently high-power telecom grade semiconductor laser capable of typically >+20 dBm power.

In at least one aspect, this application describes an exemplary use of an active controlled saturable absorber (SA) for providing high fidelity and low phase noise outputs. A Kerr lens modulation effect can also double as both base frequency tuning and phase noise suppression. The Kerr response and bandwidth is virtually instantaneous—on the order of 1 femtosecond. The SA response time is on the order of picoseconds, hence active modulation is limited by the radiofrequency local oscillator (LO) only. The synthesizer output can be coupled to the LO circuitry through a photodiode or other electro-optical or radio frequency coupling method. Tuning ranges span 5-100 GHz, output MMW powers >+10 dBm, and phase noise characteristics of <−70 dBc/Hz at 5 kHz offset at 34 GHz or better. Adjustable resonance also results in filtering of spurs other than a desired fundamental and second harmonic frequencies, thus enabling substantial SWaP-C reductions. The subject technology also enables greater channel density.

An example synthesizer includes a first resonator mirror, a second resonator mirror, and a gain medium disposed within a laser resonator cavity. The laser resonator cavity is defined by the first resonator mirror and the second resonator mirror. The synthesizer includes a saturable absorber operationally coupled to the gain medium and having active control such that the saturable absorber is configured to generate a waveform via an injection locking signal to create a mode locking effect, the waveform having a frequency comb defined by dimensions of the gain medium. The synthesizer includes a crystal electro-optical modulator disposed within the laser resonator cavity, the crystal electro-optical modulator having a nonlinear index of refraction as a function of voltage applied thereto. The waveform passes through the crystal electro-optical modulator to impinge on an external photodiode to output an emission RF waveform. Changing the voltage applied to the crystal electro-optical modulator changes the index of refraction of the crystal electro-optical modulator, altering an optical path length of the laser resonator cavity to adjust a frequency of the emission RF waveform.

The crystal electro-optical modulator may include a Kerr crystal. The crystal electro-optical modulator index of refraction may vary as a square function of voltage applied thereto. The crystal electro optical modulator may include Mn:Fe:KTN. The crystal electro-optical modulator may include a nonlinear refractive index of approximately $7 \times 10^{-15}$ $m^2/V^2$.

The mode locking effect may include a colliding pulse mode locking effect, wherein the waveform includes two counter propagating pulseletts that travel within the laser resonator cavity. The waveform may be defined by the index of refraction of the crystal electro-optical modulator. A radiation power of the waveform may be less than the critical power of the crystal electro-optical modulator. Adjusting the frequency output may include changing from C-band frequency to W-band frequency.

An example method for synthesizer includes providing a gain medium disposed within a laser resonator cavity. The method includes generating, with a saturable absorber, a waveform via an active injection locking signal to create a mode locking effect, the waveform having a frequency comb defined by dimensions of the gain medium. The method includes modulating, with a crystal electro-optical modulator, the waveform by altering an optical path length of the laser resonator cavity to adjust a frequency output from the synthesizer. The method includes impinging on an external photodiode with the waveform to output an emission RF waveform.

The method may include applying a voltage to the crystal electro-optical modulator to change the index of the refraction of the crystal electro-optical modulator. The mode locking effect may include a colliding pulse mode locking effect, wherein the waveform includes two counter propagating pulseletts that travel within the laser resonator cavity.

The crystal electro-optical modulator may include a Kerr crystal. The crystal electro-optical modulator index of refraction may vary as a square function of voltage applied thereto.

The waveform may be defined by the index of refraction of the crystal electro-optical modulator. The waveform may be defined by the optical path length of the laser resonator cavity. A radiation power of the waveform may be less than the critical power of the crystal electro-optical modulator.

Generating, with a saturable absorber, a waveform via an active injection locking signal may include actively controlling the saturable absorber with a radiofrequency waveform or electrical current to match harmonics of the laser resonator cavity. Adjusting the frequency output may include changing from C-band frequency to W-band frequency.

An example tunable source radar system includes a radar transmitter arranged to emit radar pulses and a radar receiver arranged to receive scattered laser pulses corresponding to emitted radar pulses by the radar transmitter. The tunable source radar system includes a synthesizer arranged to generate an RF or MMW frequency used by the radar transmitter and radar receiver to transmit or receive the RF or MMW frequency. The synthesizer includes a first resonator mirror, a second resonator mirror, and a gain medium disposed within a laser resonator cavity, the laser resonator cavity is defined by the first resonator mirror and the second resonator mirror. The synthesizer includes a saturable absorber operationally coupled to the gain medium and having active control such that the saturable absorber is configured to generate a waveform via an injection locking signal to create a mode locking effect, the waveform having a frequency comb defined by dimensions of the gain medium. The synthesizer includes a crystal electro-optical modulator disposed within the laser resonator cavity, the crystal electro-optical modulator having a nonlinear index of refraction as a function of voltage applied thereto. The waveform passes through the crystal electro-optical modulator to impinge on an external photodiode to output an emission RF waveform. Changing the voltage applied to the crystal electro-optical modulator changes the index of refraction of the crystal electro-optical modulator, altering an optical path length of the laser resonator cavity to adjust a frequency of the emission RF waveform.

DETAILED DESCRIPTION

The subject technology addresses deficiencies and shortcomings associated with implementing passive, mode locked, high-power synthesizers with low-noise performance. The technology includes active control of a monolithically integrated intra-cavity saturable absorber (SA) for signal, waveform, and tone injection. The technology utilizing the active SA control enables ultra-low phase noise performance. The technology includes high-Q, near instantaneous tunable filtering of all frequencies other than a desired fundamental and second harmonic. The technology employs a scalable quasi-monolithic architecture with little to no SWaP-C penalty for achieving expanded base MMW frequency tuning ranges. Synthesizers described herein employ a high-power millimeter wave synthesizer with an intra-cavity high nonlinear coefficient Kerr crystal electro-optical modulator that enables large frequency tuning ranges, enabled by optical path length changes while utilizing benign drive voltages. The Kerr crystal electro-optical modulator suppresses phase noise and cleans up spurs due to the high peak power intensity of the mode locked pulses that approach Kerr-lensing modulation effect.

A waveform is generated by an injection locking signal of a mode locking saturable absorber (SA). Inherently low phase noise is achieved via active control of the saturable absorber or optical phase lock loops for even lower phase noise performance. In this regard, the subject technology allows for direct synthesis from C-band to W-band frequencies (5 to 100 GHz), tuning capabilities within approximately <100 picoseconds, and high-Q tunable filtering with a selection of tones in a single semiconductor substrate chip with no additional filtering or switching, and does not require optical amplifiers inherently sensitive to vibration and thermal conduction.

Figure 1:
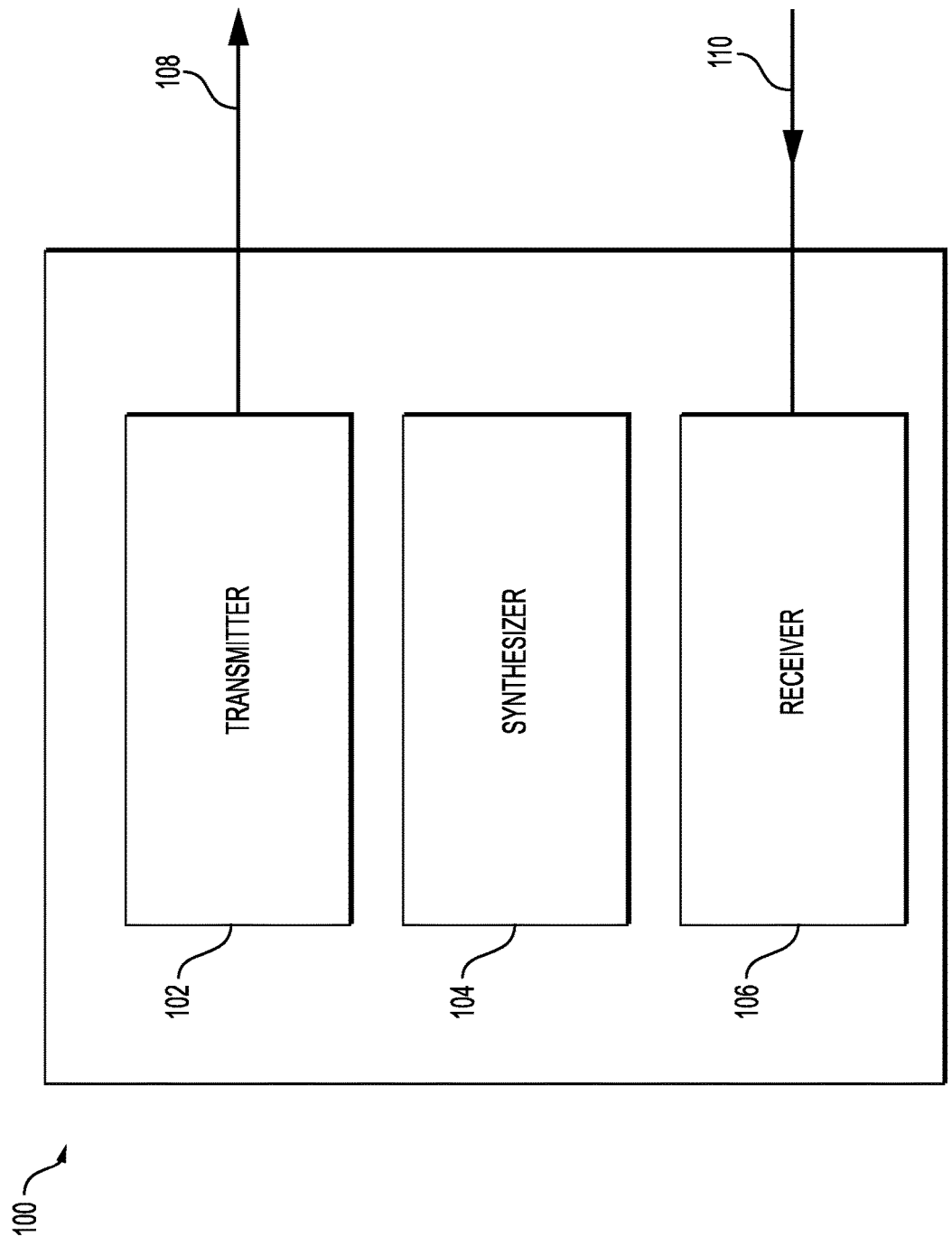
FIG. 1 is a block diagram of a RADAR or LADAR system including a mode locked semi-conductor laser-based RF/MMW synthesizer.

FIG. 1 is a block diagram of an exemplary RADAR or LADAR system 100. System 100 includes a transmitter 102, a synthesizer 104, and a receiver 106. Transmitter 102 is configured to emit a waveform comprising of certain frequency components in either continuous wave (CW) or pulsed mode 108 while receiver 106 is configured to receive reflected and/or returned signal 110 scattered from a target object and/or terrain. Synthesizer 104 generates a low noise coherent RF or MMW frequency that is used by the transmitter 102 and receiver 106 to transmit or receive the desired frequency. Synthesizer 104 may be a ML SCL based RF or MMW synthesizer.

Figure 2:
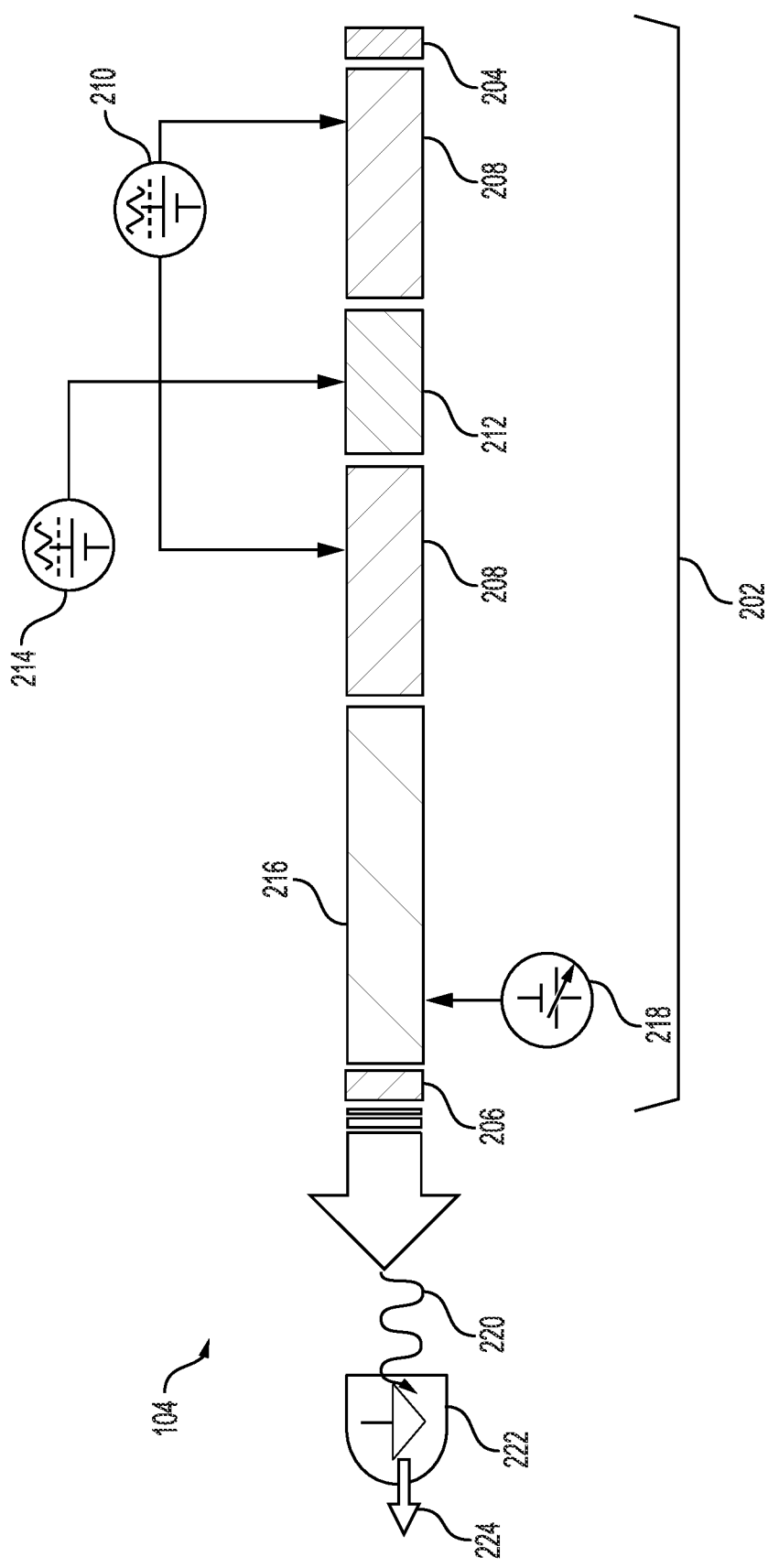
FIG. 2 is a functional block diagram showing a mode locked semi-conductor laser-based RF/MMW synthesizer with an intra cavity crystal electro-optical modulator.
Figure 3:
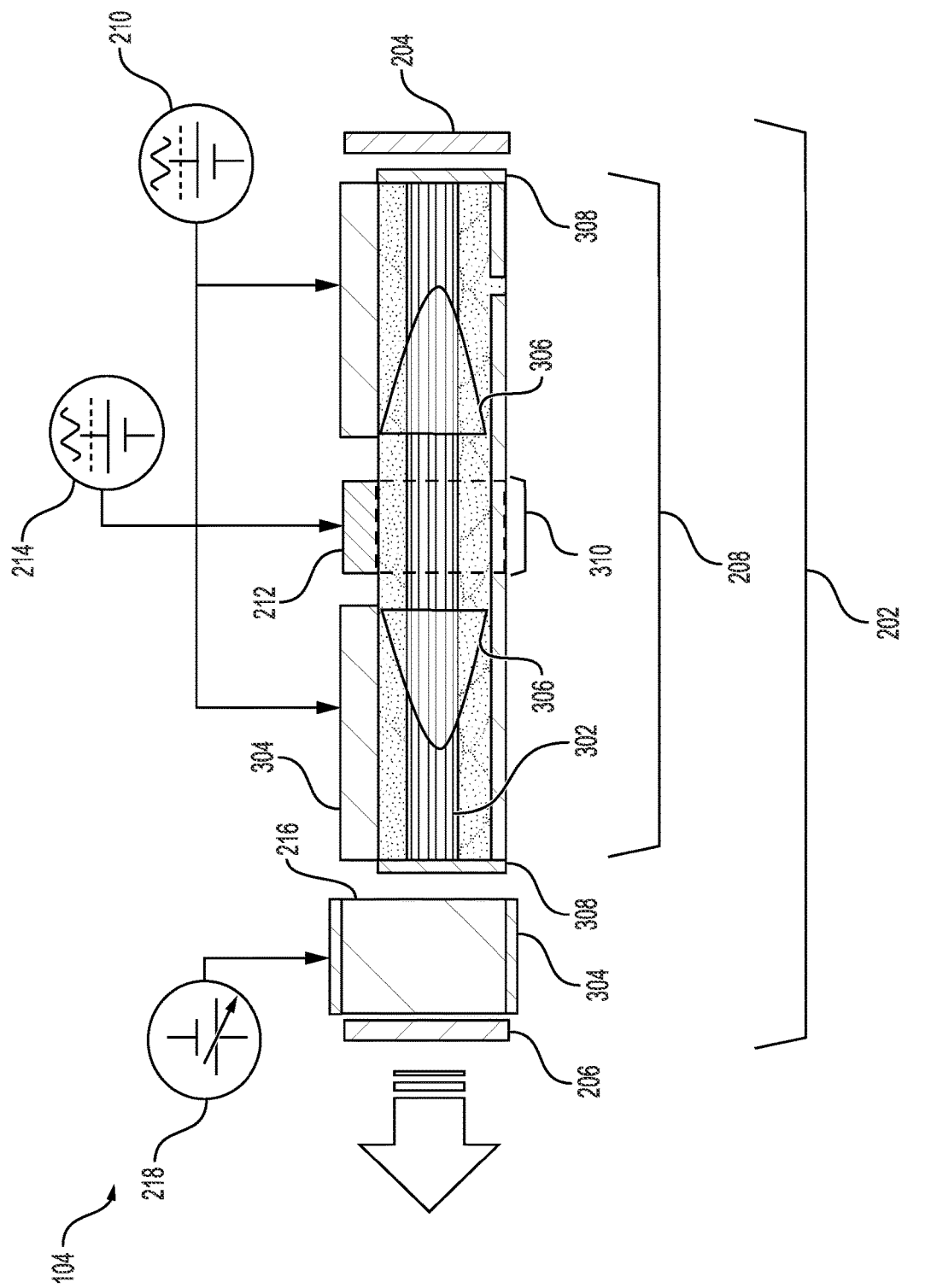
FIG. 3 is a cross-sectional view of a mode locked semi-conductor laser-based RF/MMW synthesizer of FIG. 2.

Referring now to FIG. 2 and FIG. 3, a functional block diagram showing a synthesizer 104 and a cross-sectional diagram of the synthesizer 104 are shown, respectively. The synthesizer 104 may include a quasi-monolithic architecture such that the synthesizer 104 includes a photonic integrated circuit on a non-monolithic semiconductor substrate. The synthesizer 104 may be fabricated from a variety of material systems, including electro-optic crystals such as Mn:Fe: KTN, silica on silicon, silicon on insulator, and various polymers or semiconductor materials. As such, the synthesizer 104 may include gallium arsenide, indium gallium arsenide, phosphide, and combinations and permutations thereof and may be integrated, quasi-monolithically, on a semiconductor substrate.

The synthesizer 104 includes a laser resonator cavity 202. The attributes of the laser resonator cavity 202 may determine characteristics of an emission RF waveform 224 of the synthesizer 104. For example, the laser resonator cavity 202 length, width, or height may range in size, in some implementations on the order of millimeters, thereby determining a pulse repetition rate in a mode locked laser or the pulse duration of a Q-switched laser. For example, the optical path length within the laser resonator cavity 202 may determine attributes of a waveform traveling therein. For example, optical elements, and distances between components may be altered for optimization of compactness, achieving certain values of the emission RF waveform 224 pulses such as duration and repetition rate. For example, the laser resonator cavity 202 may align optical elements such that a transverse mode occurs, commensurate with coupling to a photodiode converter. The quasi monolithic architecture afforded by PIC integration minimizes adverse effects of thermal effects in the gain medium 208 and minimizes alignment sensitivity.

The laser resonator cavity 202 may be defined by a first resonator mirror 204 and a second resonator mirror 206. In this regard, the laser resonator cavity 202 may include a cavity between the first resonator mirror 204 and a second resonator mirror 206. The first resonator mirror 204 and second resonator mirror 206 may include a high reflecting mirror or an output coupling mirror. A high reflecting mirror has reflectivity close to 100% while an output coupling mirror reflects light to a certain level, such as a portion of incident light, and may also transmit light to a certain level, such as a portion of incident light. The first resonator mirror 204 and second resonator mirror 206 may be quasi-discrete, defined by an etching or bonding process in PIC architectures. The first resonator mirror 204 and second resonator mirror 206 may also be defined by cleaved end faces of the gain medium 208 itself with appropriate, potentially additional coatings.

The first resonator mirror 204 and second resonator mirror 206 of the laser resonator cavity 202 may generate optical feedback for a stimulated emission of a waveform therein. In this regard, light confined in the laser resonator cavity 202 reflects multiple times, producing waveforms of certain fixed resonance frequencies. The waveforms may move or oscillate sinusoidally within the laser resonator cavity 202 with the same frequency and with a fixed phase relation. Waveforms may form a discrete set of frequencies, known as the modes 306 of the laser resonator cavity 202. The modes 306 within the laser resonator cavity 202 may constructively interfere with one another, such that the waveforms produce pulseletts, or a train of pulses, and suppress other frequencies of light by destructive interference.

Instead of independent oscillation of the waveforms within the laser resonator cavity, each mode 306 may operate with a fixed phase. Periodically, the modes 306 having a fixed phase may constructively interfere with one another to produce an emission RF waveform 224 with intense energy. The duration of the emission RF waveform 224 may correspond to the number of modes 306 with a frequency separation.

The laser resonator cavity 202 surrounds an active, quantum well gain medium 208. The gain medium 208 is the source of optical gain within the synthesizer 104 to amplify light. The gain is a result of the stimulated emission of the waveforms of the signal wavelength through electronic transitions to a lower energy state from a higher energy state defined by an energy band gap of the gain medium 208, explained in more detail below.

As the gain medium 208 adds energy to amplify the waveforms, it must itself receive some energy through pumping, which may typically involve electrical currents (electrical pumping) or some light inputs (optical pumping), typically at a wavelength which is shorter than the signal wavelength. As such, a drive current electrical pump source or DC source 210, such as a 5 volt bias, may be applied to the gain medium 208. Frequency modulation, phase modulation, or the like may also be applied via the DC source 210 to generate a specific waveform. The gain medium 208 may be constructed of indium, gallium arsenide, phosphide, and variations thereof. The gain medium 208 includes one or more quantum wells 302, explained in more detail with reference to FIG. 3.

The gain medium 208 may be capable of adding energy to, or amplifying, waveforms, the waveforms having a frequency comb. The frequency comb may include an optical spectrum consisting of equidistant optical frequency components, the optical frequency components having variable intensities. The frequency comb optical spectrum, as generated in a mode locked laser, may include discrete lines with an exact constant spacing which equals the pulse repetition frequency. As such, a frequency comb may include a series of optical pulses separated in time by a round-trip time within the laser resonator cavity 202. Such an optical spectrum may include pulseletts in a train of ultrashort pulses, having a fixed pulse repetition rate which determines an inverse line spacing of the optical spectrum.

The frequency comb may be defined by the dimensions of the laser resonator cavity 202, such as the length, width, or height of the laser resonator cavity 202. The frequency comb may be defined by the optical elements disposed within the laser resonator cavity, such as a crystal-optical modulator 216, explained in more detail below. The frequency comb may include millimeter waves on the order of 0 to 100 gigahertz.

The synthesizer 104 may include a mode locking device, such as a nonlinear passive element or a saturable absorber 212, which may cause the formation of the waveforms oscillating in the laser resonator cavity 202. For passive mode locking in the synthesizer 104, a saturable absorber 212 selectively absorbs low-intensity light, while transmitting or reflecting light which is of sufficiently high intensity, thereby acting as an optical gate.

The saturable absorber 212 is operationally coupled to the gain medium 208. In this regard, the saturable absorber may be positioned between the first resonator mirror 204 and the second resonator mirror 206. Each time a waveform hits the saturable absorber 212, the saturable absorber 212 saturates the absorption, thus temporarily reducing losses of energy. The saturable absorber 212 can suppress any additional weaker pulses in addition to any continuous background light. Attributes of the saturable absorber 212 may vary depending on a desired pulse duration, pulse repetition rates, optical wavelength, output power, etc. Absorption may produce a response time on the order of picoseconds.

Saturable absorber 212 may be constructed of indium, gallium arsenide, phosphide, and variations thereof. As such, the saturable absorber 212 is an optical component with a certain optical absorption loss, which is reduced at high optical intensities. Such absorption can occur, e.g., in a medium with absorbing dopant ions, when a strong optical intensity leads to depletion of the ground state of these ions. When light of low intensity is incident upon the saturable absorber 212, its light transmittance is relatively low, resulting in high laser resonator cavity 202 energy losses. As the incident light energy increases, due to the buildup of energy within the laser resonator cavity 202, the light transmittance of the saturable absorber 212 material increases. At some point, the light transmittance may increase to a level such that the saturable absorber 212 "bleaches", i.e., becomes transparent, so that the laser resonator cavity 202 energy losses become low, and a light pulse with a pulse duration is emitted. The light pulse may be defined by a time bandwidth product specific to the gain medium 208 and associated laser resonator cavity 202 design, affording a certain gain bandwidth.

The saturable absorber 212 may include a solid (crystal, glass, polymer) or be constructed of identical gain medium 208 structure that is electrically isolated from the injection current excitation source by an etching process. As such, gain medium 208 may include an electrically isolated region 310 that does not output any gain to waveforms oscillating in the laser resonator cavity 202. The electrically isolated region 310 may include no electric bias applied thereto. Though, an electrical current 214 may be applied to the electrically isolated region 310, known as active control, through the saturable absorber 212 to create an injection locking signal to enable a low frequency noise frequency comb of a waveform. Actively controlling the saturable absorber 212 with radiofrequency waveforms or an electrical current 214 serving as an injection locked active control signal may include matching a resonant frequency to the harmonics of the laser resonator cavity 202. The saturable absorber 212 may include a separate waveform or injection control signal implemented through the electrical current 214 which may include a zero bias (passive mode), reverse DC bias (active mode), or RF modulated waveform such as a filter tone input for intended dual functionality of spur rejection and simultaneous tone amplification.

In the steady state, saturable absorber 212 can be actively controlled such that the waveform can be saturated to levels sufficient for compensating losses, whereas any light of lower intensity which contacts the saturable absorber 212 at other times will experience losses higher than the gain of the lower intensity light, since the saturable absorber 212 cannot be saturated by this light. As such, the resonant frequency of waveforms oscillating in the gain medium 208 may equate to the frequency biased by the electrical current 214. Any other frequencies inputs, or spurs, into the saturable absorber 212 may be filtered. As such, actively controlled SA 212 may include a dedicated current, signal waveform, or tone injection via electrical current 214 to facilitate a lower phase noise in the frequency comb spectra and spur rejection and filtering of certain frequency tones and signals.

The combination of the electrical current 214 and active control effectively tune and filter signals within the laser resonator cavity 202 to the fundamental frequency of an active control signal. This results in a high-Q filter that removes spurs on the active control input signal, explained in more detail with reference to FIG. 6. The emission RF waveform 224 is effectively a filtered and amplified version of the active control signal.

Active control of the saturable absorber 212 may demonstrate low phase noise performance, such as better than roughly <−70 dBc/Hz phase noise at a 5 kHz offset for a 34 GHz signal. This is equivalent to roughly <100 Hz linewidth.

Because the laser resonator cavity 202 receives optical feedback from the first resonator mirror 204 and the second resonator mirror 206, the optical feedback may be used as a seed signal, which may serve as an injection locked active control signal. The contribution of the seed signal leaking through the first 204 or second resonator mirror 206 adds constructively to an oscillating waveform within the laser resonator cavity 202 leading to regenerative amplification of the oscillating waveform. Without an injection locking signal, the synthesizer 104 may emit an emission RF waveform 224 with multiple modes 306 and the power distribution between modes 306 may fluctuate from pulse to pulse.

Injection locking is used for amplification and duplication of a low-noise synthesizer 104. The frequency generated by a waveform may exactly equal the injected seed signal frequency or the electric current 214 such that the frequency is locked. Through using a synthesizer 104 with a saturable absorber 212 and modulating an electrical injection 214 at the same frequency the laser is locked at, the synthesizer 104 may be stabilized.

The synthesizer 104 includes a crystal electro-optical modulator 216. The crystal electro-optical modulator 216 may be disposed within the laser resonator cavity 202. The crystal electro-optical modulator 216 may be disposed downstream of the gain medium 208, such that it is in closer proximity to an external photodiode 222 than the gain medium 208. The crystal electro-optical modulator 216 may include a Kerr crystal. The crystal electro-optical modulator 216 includes a medium with an index of refraction. The index of refraction of the crystal optical modulator 216 determines how fast light travels therethrough, as shown in the following equation:

$$n = \frac{c}{v} \qquad (1)$$

where n is a dimensionless number expressed as a function of vacuum light speed and the speed of light in the medium, c is the speed of light in a vacuum, v is the velocity (or more specifically, group velocity) in the medium.

The synthesizer 104 may include an electrical conductor 304 coupled to the crystal electro-optical modulator 216 to vary the voltage of an electric field applied thereto. The voltage may include a DC bias 218. In this regard, light propagating through the crystal electro-optical modulator 216 may experience a polarization-dependent change of optical phase due to a change of the index of refraction of the crystal electro-optical modulator 216 based on the electric field applied. The change in optical phase is nonlinearly proportional to the voltage applied to the crystal electro-optical modulator 216.

As such, the optical phase of light of waveforms passing through the crystal electro-optical modulator 216 may vary proportional to the square of the voltage applied to the crystal electro-optical modulator 216 via the electric field. The optical phase of light of waveforms passing through the crystal electro-optical modulator 216 may also vary proportional to the third, fourth, fifth, six, seventh, eighth, ninth, tenth, and so on power of the voltage applied to the crystal electro-optical modulator 216 via the electric field. The optical phase of light of waveforms passing through the crystal electro-optical modulator 216 may vary proportional to the voltage applied to the crystal electro-optical modulator 216 via the electric field.

Assuming a constant electric field strength over some optical path length L, the field-induced optical phase change is represented as follows:

$$\Delta\varphi = \frac{2\pi}{\lambda}\Delta n = 2\pi KE^2 \quad (2)$$

where $\Delta n$ is the difference in refractive index between two polarization directions (parallel and perpendicular to the electric field direction), K is the Kerr constant of the material, E is the applied electric field strength, $\lambda$ is the wavelength of light passing through the crystal electro-optical modulator 216, and $\Delta\varphi$ is the field-induced optical phase change.

For transparent crystals and glasses (e.g. fused silica, sapphire), the nonlinear refractive index or nonlinear coefficient is typically of the order of $10^{-16}$ cm$^2$/W. Silica, as used e.g. in silica fibers, has a particularly low nonlinear index of $2.7 \times 10^{-16}$ cm$^2$/W for wavelengths around 1.5 µm, whereas some other Kerr crystals such as Mn:Fe:KTN exhibit greater than ten times higher values. In some implementations, the crystal electro-optical modulator 216 Kerr nonlinear refractive index is approximately $7 \times 10^{-15}$ m$^2$/V$^2$. In some implementations, the nonlinear and linear Kerr index of refraction of the crystal electro-optical modulator 216 is higher than silica.

Because the index of refraction of the crystal electro-optical modulator 216 is variable in relation to the voltage applied thereto, the field-induced optical phase change of light of waveforms passing therethrough, such as a waveform having a frequency comb, may be continuously tuned, such that the crystal electro-optical modulator 216 may alter the frequency comb within the millimeter wavelength ranges. This is because the frequency comb of waveforms oscillating within the laser resonator cavity 202 are defined by the dimensions and optical path length of the laser resonator cavity 202. Because the index of refraction of the crystal optical modulator 216 can be altered by introducing a DC bias 218, waveforms traveling therethrough can be altered based on the travel time through the crystal optical modulator 216, effectively increasing or decreasing the optical path length of light traveling within the laser resonator cavity 202. As such, light traveling through the laser resonator cavity 202 may have a modulated cavity round trip time.

The crystal electro-optical modulator 216 has a critical power, defined by the wavelength of a waveform propagating therethrough, a constant which depends on the initial spatial distribution of the light, and the linear and nonlinear components of the refractive index. Self-focusing occurs if a radiation power of the waveform is approaching, equal, or greater than the critical power. Self-focusing is a nonlinear optical process induced by the change in refractive index of materials exposed to intense electromagnetic radiation. As the refractive index of the crystal electro-optical modulator 216 increases with the electric field intensity, the crystal electro-optical modulator 216 acts as a focusing lens for light characterized by an initial transverse intensity gradient, as in a laser beam.

Self-focusing is typically used to generate a frequency comb. Though here, in some implementations, waveforms of light that travel within the laser resonator cavity 202 do not reach the critical power of the crystal electro-optical modulator 216, such as to avoid self-focusing. Waveforms that travel within the laser resonator cavity 202 may include a radiation power of approximately 0.05-0.10% the critical power of the crystal electro-optical modulator 216. Waveforms that travel within the laser resonator cavity 202 may include a radiation power of approximately 0.05-0.20% the critical power of the crystal electro-optical modulator 216. Waveforms that travel within the laser resonator cavity 202 may include a radiation power approximately at 0.05-0.20% the critical power of the crystal electro-optical modulator 216. Waveforms that travel within the laser resonator cavity 202 may include a radiation power of approximately 0.05-0.30% the critical power of the crystal electro-optical modulator 216. Waveforms that travel within the laser resonator cavity 202 may include a radiation power of approximately 0.05-0.20% the critical power of the crystal electro-optical modulator 216. Waveforms that travel within the laser resonator cavity 202 may include a radiation power of approximately 0.05% the critical power of the crystal electro-optical modulator 216. Waveforms that travel within the laser resonator cavity 202 may include a radiation power of approximately 0.10% the critical power of the crystal electro-optical modulator 216. Waveforms that travel within the laser resonator cavity 202 may include a radiation power below the critical power of the crystal electro-optical modulator 216.

A waveform 220 propagating through the crystal electro-optical modulator 216 includes a frequency comb with equivalence in the time domain as waveforms within the laser resonator cavity 202, and in the frequency domain such that the frequency comb is defined by the dimensions and optical path length within the laser resonator cavity 202. The waveform 220 exiting the crystal electro-optical modulator 216 may thereafter impinge on a photodiode 222. The photodiode 222 may include a high bandwidth response. The photodiode 222 may output an emission RF waveform 224. The emission RF waveform 224 may include a high-power radiofrequency output.

FIG. 3 is a cross-sectional view of the ML SCL based RF/MMW synthesizer 104 of FIG. 2, showing a fundamental, f, and colliding pulse mode locked (CPM) 2f base frequency and commensurate f, 2f frequency comb generation. The synthesizer 104 gain medium 208 has multiple quantum wells 302 as mentioned prior. The quantum wells 302 of the gain medium 208 may include one or more thin layers that confine particles, such as photons, in a waveform in a dimension perpendicular to the surface of the thin layers. The particles may move freely in a direction planar to the one or more thin layers. The quantum wells 302 may include at least one layer of a semiconductor medium, embedded between other semiconductor mediums, each medium having a band gap, or an area where the level occupation according to the Fermi function drops substantially. Particularly, the quantum wells 302 may be embedded between two wider layers with a higher band gap. This layering may function as a waveform guide, while electrons and holes are efficiently captured by the quantum well 302, if the difference in bandgap energies is sufficiently large. The thickness of each quantum well 302 may range on the nanometer scale. Spacing between quantum wells 302 may be large enough to avoid overlap of a corresponding waveform function. The gain medium 208 includes optical modes 306 confined therein.

As shown in FIG. 3, synthesizer 104 may also include electrical conductors 304 coupled to the crystal electro-optical modulator 216 to vary the voltage of an electric field applied thereto. The synthesizer 104 may also include electrical conductors 304 coupled the saturable absorber 212 and the gain medium 208 to vary the voltage of an electric field applied thereto. The electrical conductors 304 may include gold. Synthesizer 104 may include anti-reflection coating 308 applied on either side of the gain medium 208 to reduce reflectance of gain medium 208 surfaces due to Fresnel reflections within a wavelength range, introducing destructive interference.

Figure 4:
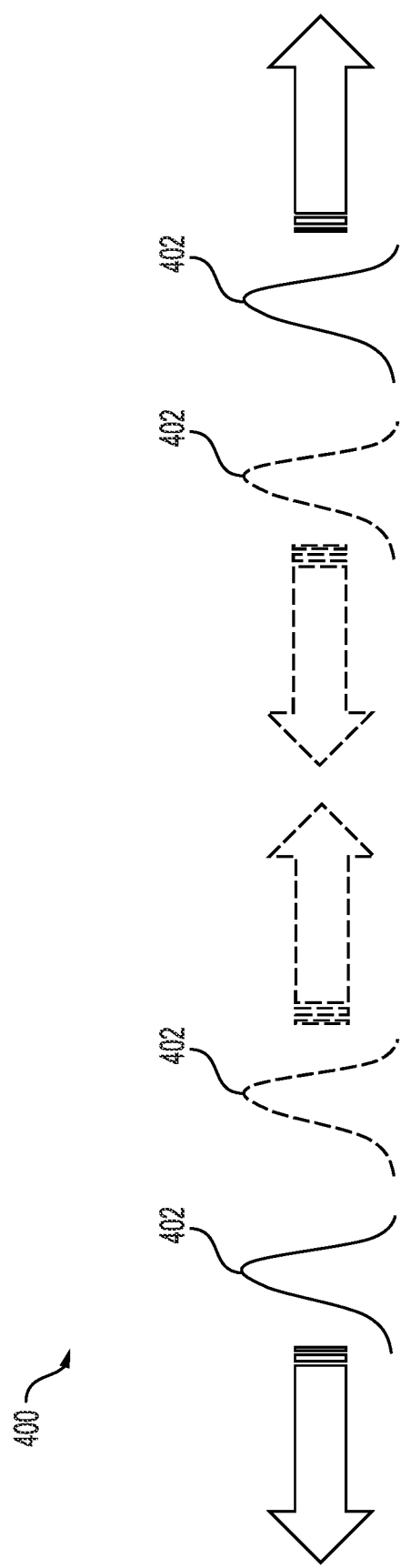
FIG. 4 is a waveform diagram detailing fundamental mode locked and colliding pulse mode locked waveform generation within a laser resonator cavity.

Referring now to FIG. 4, a waveform diagram 400 is shown with active saturable absorber 212 control. The waveform diagram 400 depicts an oscillation pattern of a waveform 402 within the laser resonator cavity 202. The waveform may include pulseletts such that one or more pulseletts may travel in a counter propagating operation, such as equal and opposite to each other within the laser resonator cavity 202. This example describes a CPM locked operation. Though, waveforms may also travel in a fundamental operation, matching laser resonator cavity 202 harmonics.

Figure 5:
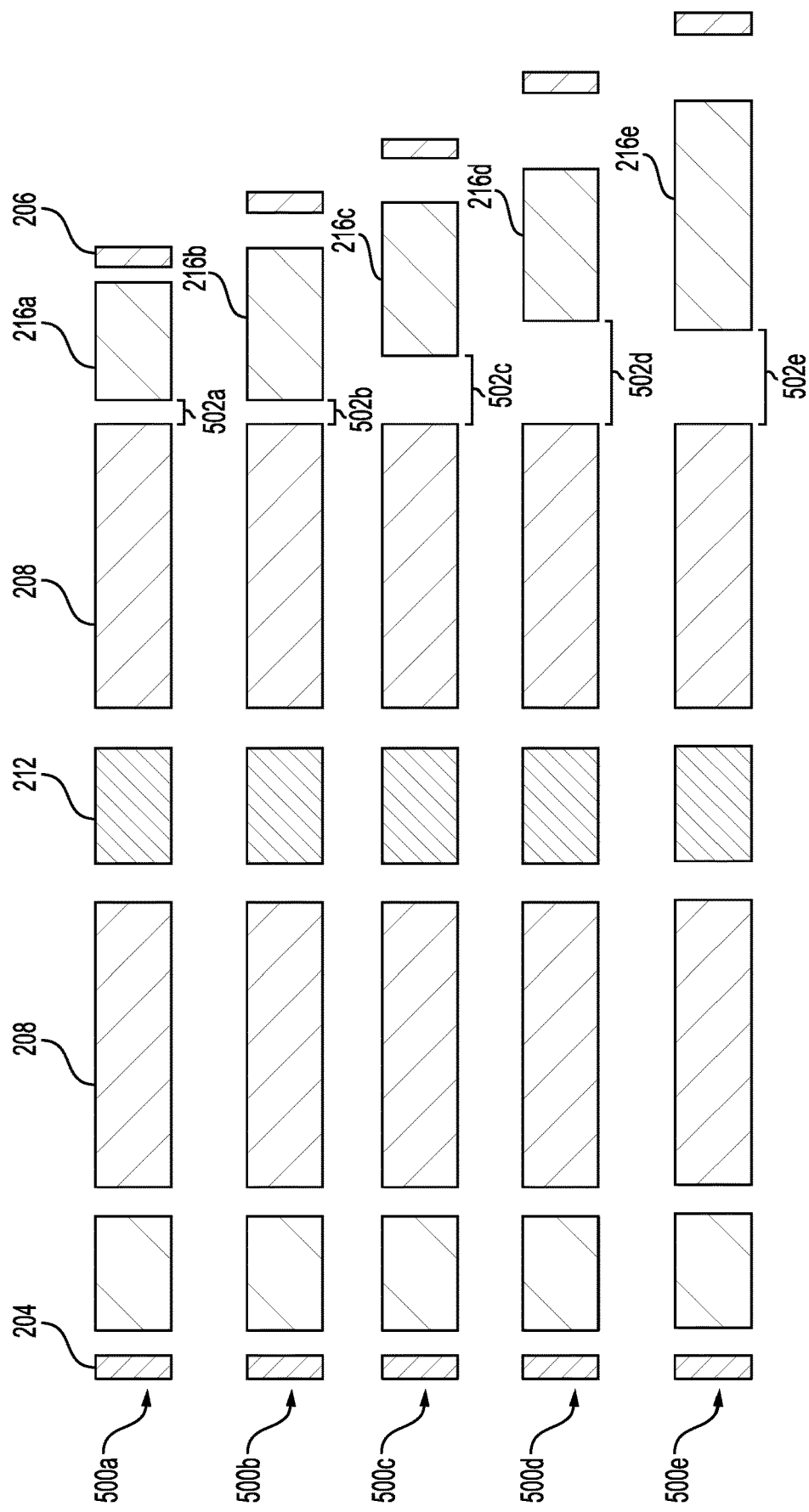
FIG. 5 shows an implementation of a mode locked semi-conductor laser-based RF/MMW synthesizer with varying cavity lengths.

FIG. 5 shows implementations of varied laser resonator cavities in several synthesizers 500(a), 500(b), 500(c), 500(d), 500(e) as described herein. The implementations of synthesizers 500(a), 500(b), 500(c), 500(d), 500(e) may include different sized crystal electro-optical modulators. For example, crystal electro-optical modulator 216(a) may be longer than crystal electro-optical modulator 216(b) relative an optical path or vice versa. For example, crystal electro-optical modulator 216(a) may be longer than crystal electro-optical modulator 216(c) relative an optical path or vice versa. For example, crystal electro-optical modulator 216(a) may be longer than crystal electro-optical modulator 216(d) relative an optical path or vice versa. For example, crystal electro-optical modulator 216(a) may be longer than crystal electro-optical modulator 216(e) relative an optical path or vice versa, and so on. In some implementations crystal electro-optical modulator 216(e) may be longer than crystal electro-optical modulator 216(a), 216(b), 216(c), 216(d) or vice versa, and so on.

For example, crystal electro-optical modulator 216(a) may be wider or taller than crystal electro-optical modulator 216(b) relative an optical path or vice versa. For example, crystal electro-optical modulator 216(a) may be wider or taller than crystal electro-optical modulator 216(c) relative an optical path or vice versa. For example, crystal electro-optical modulator 216(a) may be wider or taller than crystal electro-optical modulator 216(d) relative an optical path or vice versa. For example, crystal electro-optical modulator 216(a) may be wider or taller than crystal electro-optical modulator 216(e) relative an optical path or vice versa, and so on. In some implementations crystal electro-optical modulator 216(e) may be wider or taller than crystal electro-optical modulator 216(a), 216(b), 216(c), 216(d) or vice versa, and so on.

The implementations of synthesizers 500(a), 500(b), 500(c), 500(d), 500(e) may include crystal electro-optical modulators with different indices of refraction, thus lengthening or shortening an optical path. In this regard, light of waveforms traveling through a laser resonator cavity 202 may have a vacuum round trip time that is lengthened or shortened. Implementations of synthesizers 500(a), 500(b), 500(c), 500(d), 500(e) may also have applied a higher or lower voltage thereto, thus modulating to a different degree.

The implementations of synthesizers 500(a), 500(b), 500(c), 500(d), 500(e) may include a varied sized space 502(a), 502(b), 502(c), 502(d), 502(e) between the gain medium 208 and crystal electro-optical modulator 216(a), 216(b), 216(c), 216(d), and/or 216(e), thus lengthening or shortening an optical path. In this regard, light of waveforms traveling through a laser resonator cavity 202 may have a vacuum round trip time that is lengthened or shortened.

With these variables in mind, synthesizer 500(a) may be capable of a continuous tuning range of 45-50 GHz. Synthesizer 500(b) may be capable of a continuous tuning range of 40-45 GHz. Synthesizer 500(c) may be capable of a continuous tuning range of 35-40 GHz. Synthesizer 500(d) may be capable of a continuous tuning range of 30-35 GHz. Synthesizer 500(e) may be capable of a continuous tuning range of 25-30 GHz. Implementing several mode locked semiconductor lasers or synthesizers in an architecture can thus cover continuous tuning ranges from 5 GHz to 100 GHz.

Figure 6:
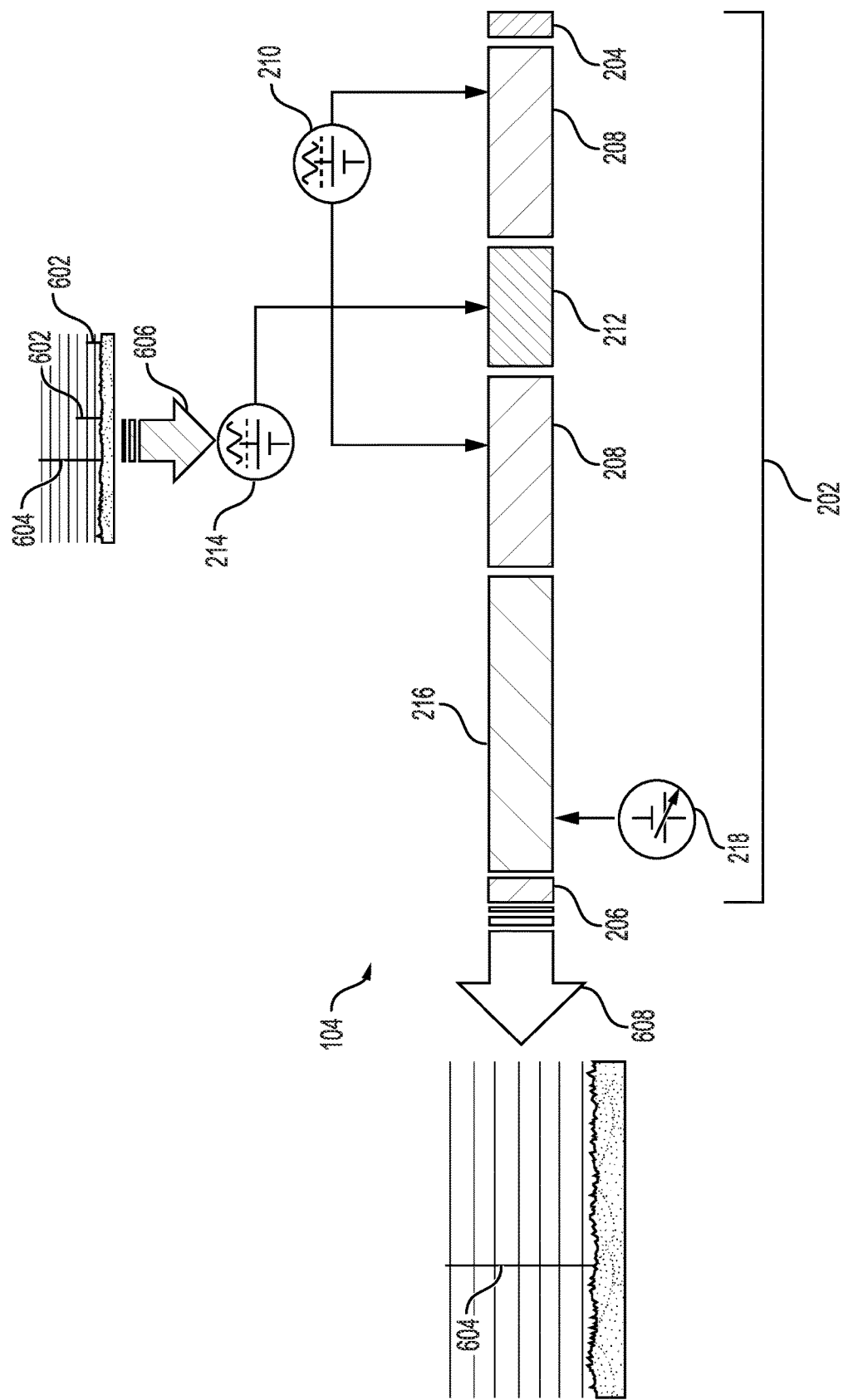
FIG. 6 shows an implementation of a mode locked semi-conductor laser-based RF/MMW synthesizer with dual function spur suppression and signal amplification.

FIG. 6 shows an implementation a mode locked semiconductor laser-based RF/MMW synthesizer with dual function spur 602 suppression and signal 604 amplification. As mentioned prior, actively controlling the saturable absorber 212 with radiofrequency waveforms or an electrical current 214 serving as an injection locked active control signal, may include matching a resonant frequency to the harmonics of the laser resonator cavity 202. As such, the saturable absorber 212 may serve as a filter for the tone input for the dual functionality of spur 602 rejection and simultaneous signal 604 amplification in an output signal 608. This results in a high-Q filter that removes spurs 602 on the active control input signal 606. The output signal 608 is effectively a filtered and amplified input injected tone, such that it contains less spurs 602 than the active control input signal 606 and is an amplified version of the active control signal 604.

As such, the subject technology addresses the need for compact, low SWaP-C MMW sources and synthesizers with wideband frequency tunability. This is achieved through the use of an intra-cavity Kerr modulator that enables oscillator cavity length changes with modest footprint and benign control voltage levels.

Elements, equations, or steps of different implementations described may be combined to form other implementations not specifically set forth previously. Elements, equations, or steps may be left out of the lasers or processes described previously without adversely affecting their operation or the operation of the laser in general. Furthermore, various separate elements, equations, or steps may be combined into one or more individual elements or steps to perform the functions described in this specification. It should be understood by one skilled in the art that equations set forth herein may be otherwise expressed in a different form or manner with different underlying assumptions, thus not specifically set forth.

Other implementations not specifically described in this specification are also within the scope of the following claims.

What is claimed is:

1. A synthesizer comprising:
    a first resonator mirror;
    a second resonator mirror;
    a gain medium disposed within a laser resonator cavity, the laser resonator cavity defined by the first resonator mirror and the second resonator mirror;
    a saturable absorber operationally coupled to the gain medium and having active control such that the saturable absorber is configured to generate a waveform via an injection locking signal to create a mode locking effect, the waveform having a frequency comb defined by one or more dimensions of the gain medium including at least one of a length, a width, or a height of the gain medium; and a crystal electro-optical modulator disposed within the laser resonator cavity, the crystal electro-optical modulator having a nonlinear index of refraction as a function of voltage applied thereto;

wherein the synthesizer is configured such that (i) the waveform passes through the crystal electro-optical modulator to impinge on an external photodiode to output an emission RF waveform and (ii) changing the voltage applied to the crystal electro-optical modulator changes the index of refraction of the crystal electro-optical modulator, altering an optical path length of the laser resonator cavity to adjust a frequency of the emission RF waveform.

2. The synthesizer of claim 1, wherein the crystal electro-optical modulator includes a Kerr crystal.

3. The synthesizer of claim 1, wherein the nonlinear index of refraction of the crystal electro-optical modulator varies as a square function of the voltage applied thereto.

4. The synthesizer of claim 1, wherein the crystal electro-optical modulator includes Mn:Fe:KTN.

5. The synthesizer of claim 1, wherein the crystal electro-optical modulator has a nonlinear refractive index of approximately $7 \times 10^{-15}$ m$^2$/V$^2$.

6. The synthesizer of claim 1, wherein the mode locking effect includes a colliding pulse mode locking effect, wherein the waveform includes two counter propagating pulseletts that travel within the laser resonator cavity.

7. The synthesizer of claim 1, wherein the waveform is defined by the index of refraction of the crystal electro-optical modulator.

8. The synthesizer of claim 1, wherein a radiation power of the waveform is less than a critical power defined by a wavelength of the waveform propagating through the crystal electro-optical modulator.

9. The synthesizer of claim 1, wherein the synthesizer is configured to adjust the frequency by changing from C-band frequency to W-band frequency.

10. A method for synthesizing comprising:
providing a gain medium disposed within a laser resonator cavity;
generating, with a saturable absorber, a waveform via an active injection locking signal to create a mode locking effect, the waveform having a frequency comb defined by one or more dimensions of the gain medium including at least one of a length, a width, or a height of the gain medium;
modulating, with a crystal electro-optical modulator, the waveform by altering an optical path length of the laser resonator cavity to adjust a frequency output from a synthesizer; and
impinging on an external photodiode with the waveform to output an emission RF waveform.

11. The method of claim 10, wherein the crystal electro-optical modulator includes a Kerr crystal.

12. The method of claim 10, wherein a nonlinear index of refraction of the crystal electro-optical modulator varies as a square function of voltage applied thereto.

13. The method of claim 10, further comprising applying a voltage to the crystal electro-optical modulator to change a nonlinear index of refraction of the crystal electro-optical modulator.

14. The method of claim 10, wherein the mode locking effect includes a colliding pulse mode locking effect, wherein the waveform includes two counter propagating pulseletts that travel within the laser resonator cavity.

15. The method of claim 10, wherein the waveform is defined by a nonlinear index of refraction of the crystal electro-optical modulator.

16. The method of claim 10, wherein the waveform is defined by the optical path length of the laser resonator cavity.

17. The method of claim 10, wherein generating the waveform via the active injection locking signal includes actively controlling the saturable absorber with a radiofrequency waveform or electrical current to match harmonics of the laser resonator cavity.

18. The method of claim 10, wherein the frequency output is adjusted by changing from C-band frequency to W-band frequency.

19. The method of claim 10, wherein a radiation power of the waveform is less than a critical power defined by a wavelength of the waveform propagating through the crystal electro-optical modulator.

20. A tunable source radar system comprising:
a radar transmitter configured to emit radar pulses;
a radar receiver configured to receive scattered radar pulses corresponding to the emitted radar pulses; and
a synthesizer configured to generate an RF or MMW frequency used by the radar transmitter and the radar receiver to transmit or receive at a specified frequency, the synthesizer including:
a first resonator mirror;
a second resonator mirror;
a gain medium disposed within a laser resonator cavity, the laser resonator cavity defined by the first resonator mirror and the second resonator mirror;
a saturable absorber operationally coupled to the gain medium and having active control such that the saturable absorber is configured to generate a waveform via an injection locking signal to create a mode locking effect, the waveform having a frequency comb defined by one or more dimensions of the gain medium including at least one of a length, a width, or a height of the gain medium; and
a crystal electro-optical modulator disposed within the laser resonator cavity, the crystal electro-optical modulator having a nonlinear index of refraction as a function of voltage applied thereto;
wherein the synthesizer is configured such that (i) the waveform passes through the crystal electro-optical modulator to impinge on an external photodiode to output an emission RF waveform and (ii) changing the voltage applied to the crystal electro-optical modulator changes the index of refraction of the crystal electro-optical modulator, altering an optical path length of the laser resonator cavity to adjust a frequency of the emission RF waveform.

* * * * *